(12) United States Patent
Sawa et al.

(10) Patent No.: US 7,040,656 B2
(45) Date of Patent: May 9, 2006

(54) INFLATOR

(75) Inventors: Shoichi Sawa, Tokyo (JP); Takashi Furusawa, Tokyo (JP); Yuichi Nanbu, Tokyo (JP)

(73) Assignee: Takata Corporation, Tokyo (JP)

( * ) Notice: Subject to any disclaimer, the term of this patent is extended or adjusted under 35 U.S.C. 154(b) by 433 days.

(21) Appl. No.: 10/064,064

(22) Filed: Jun. 6, 2002

(65) Prior Publication Data

US 2002/0185849 A1     Dec. 12, 2002

(30) Foreign Application Priority Data

Jun. 6, 2001     (JP)     .............................. 2001-171276

(51) Int. Cl.
*B60R 21/26* (2006.01)

(52) U.S. Cl. ..................................... 280/741

(58) Field of Classification Search .................. 280/741
See application file for complete search history.

(56) References Cited

U.S. PATENT DOCUMENTS

| 2,421,228 | A | * | 5/1947 | White ......................... 285/110 |
| 5,012,954 | A | * | 5/1991 | Will ............................... 222/5 |
| 5,189,255 | A | * | 2/1993 | Fukabori et al. ............ 102/531 |
| 5,388,858 | A | * | 2/1995 | Cuevas ..................... 280/728.2 |
| 5,423,568 | A | * | 6/1995 | Zushi et al. .............. 280/728.2 |
| 5,429,386 | A | | 7/1995 | Mihm |
| 5,568,663 | A | * | 10/1996 | Brown ........................... 5/628 |
| 5,613,700 | A | * | 3/1997 | Hiramitsu et al. ........ 280/728.2 |
| 5,716,072 | A | * | 2/1998 | O'Driscoll ................... 280/740 |
| 5,779,266 | A | | 7/1998 | Moore et al. |
| 5,887,893 | A | | 3/1999 | Lang et al. |
| 5,924,728 | A | | 7/1999 | Evans et al. |
| 6,010,153 | A | | 1/2000 | Halas et al. |
| 6,361,064 | B1 | * | 3/2002 | Hopf et al. ............... 280/728.1 |
| 6,439,924 | B1 | * | 8/2002 | Kooiman ..................... 439/578 |
| 6,544,062 | B1 | * | 4/2003 | Loveless et al. ............ 439/310 |

FOREIGN PATENT DOCUMENTS

| EP | 0805071 | 11/1997 |
| JP | 9-175315 | 7/1997 |
| JP | 10-152012 | 6/1998 |
| JP | 10-230814 | 9/1998 |

\* cited by examiner

*Primary Examiner*—Teri Pham Luu
*Assistant Examiner*—Kimberly S. Smith
(74) *Attorney, Agent, or Firm*—Foley & Lardner LLP

(57) ABSTRACT

To provide an inflator which can be easily manufactured in a simple manufacturing process so as not to be disassembled.

In an inflator, an orifice member 16 of a bottle 3 is provided with projections 43 formed on the periphery of the orifice member 16, extending in the axial direction thereof, and key grooves 47 formed in the periphery of the orifice member 16, extending in the axial direction thereof. A diffuser 7 is provided, in the inner periphery thereof, with guide grooves 49 for guiding the projections 43 of the orifice member 16 when the diffuser 7 and the orifice member 16 are coupled with each other, grooves 41 which mate with the projections 43 after the diffuser 7 or the orifice member 16 rotates, and key grooves 51 which associate with the key grooves 47 of the orifice member 16. Keys 45 which are inserted into the key grooves 47 and 51 and thereby prevent the orifice member 16 or the diffuser 7 from rotating are also provided. The orifice member 16 and the diffuser 7 are coupled with each other, either one of the components is rotated, and both components are thereby connected to each other.

6 Claims, 4 Drawing Sheets

(A)

(B)

(C)

*PRIOR ART*

INFLATOR

DETAILED DESCRIPTION OF THE INVENTION

1. Technical Field of the Invention

The present invention relates to an inflator which generates gas for inflating and extending an airbag.

2. Description of the Related Art

There are three types of inflator, which generate gas for expanding airbags, such as a combustion type, a stored-gas type, and a hybrid type. The combustion type inflates an airbag with combustion gas which is generated by chemical reaction started by combustion of a gas-generating agent (propellant). The stored-gas type ejects a high-pressure gas stored in a container. The hybrid type, in which a gas-generating agent and a high-pressure gas are used in combination, generates gas for inflation by mixing a gas generated by the combustion of the gas-generating agent with the high-pressure gas.

In FIG. 4, a stored-gas-type inflator is shown.

FIG. 4 is a schematic longitudinal-sectional view of the stored-gas-type inflator.

An inflator 100 shown in FIG. 4 includes a bottle 101 to be charged with a high-pressure gas, and a sleeve (receiving member) 103 for receiving a perforation structure. A sealing plate 107 is fixed by welding to an orifice 105 of the bottle 101. The sealing plate 107 swells toward the side of the sleeve 103, as shown in the drawing, with the pressure of the gas stored in the bottle 101.

The sleeve 103 is connected by welding to the bottle 101 at the orifice 105 thereof. A plurality of gas-outlets 109 for the high-pressure gas from the bottle 101 to pass therethrough when the inflator 100 operates are formed in the sidewall of the sleeve 103. A perforation structure 111 is coupled with the sleeve 103 at an end thereof (an open end to the left in the drawing). The perforation structure 111 includes an initiator 111a, a piston 111b, a barrel 111c, and the like.

An airbag body (not shown) is mounted so as to communicate with the gas-outlets 109. When the automobile receives an impact, a sensor not shown operates to actuate an ignition plug which ignites the initiator 111a, thereby generating a blast. The blast pushes the piston 111b to the right in the drawing, and the tip of the piston 111b breaks the sealing plate 107 at a central part thereof. Then, the high-pressure gas sealed in the bottle 101 is ejected into the sleeve 103 and is ejected and supplied into the bag body through the gas-outlets 109.

Hybrid-type inflators are disclosed in, for example, Japanese Unexamined Patent Application Publication Nos. 9-175315, 10-152012, and 10-230814.

The hybrid-type inflators must be each provided with a combustion chamber in which a solid or liquid gas-generating agent is burned and a container which contains a compressed gas to be mixed with the combustion gas generated in the combustion chamber. The connection between the combustion chamber and the container in each case disclosed in the above-mentioned publications is performed by welding.

[Problems to be Solved by the Invention]

As described above, the connection between each chamber in the stored-gas type or the hybrid type is generally performed by welding. In the hybrid type, in particular, which is provided with a plurality of the sealed chambers, the number of welding processes is increased. In the welding processes, generally, there are many working steps, quality inspection is complex, and manufacturing time and costs are increased.

Accordingly, an object of the present invention is to provide an inflator which can be easily manufactured in a simple manufacturing process so as not to be disassembled.

[Means for Solving the Problems]

To this end, an inflator according to the present invention comprises a bottle having an orifice and to be charged with a high-pressure gas; a sealing plate which seals the bottle at the orifice; and a perforation structure for breaking the sealing plate. The bottle and/or a receiving member which receives the perforation structure include projection-groove mating parts at which the bottle and the receiving member are coupled with each other by rotating the bottle or the receiving member while being mated with each other, hollow parts which guide the mating parts when the bottle and the receiving member are coupled with each other, and key grooves, the key grooves formed in the bottle associating with the key grooves formed in the receiving member when the bottle or the receiving member rotates. The inflator further comprises keys for preventing the bottle or the receiving member from rotation by being inserted into the key grooves.

The bottle charged with a high-pressure gas and the receiving member receiving the perforation structure are connected to each other at the projection-groove mating parts and are fixed to each other by the keys so that the bottle or the receiving member does not rotate. Therefore, both components can be assembled with each other in a simple assembly process without using welding, and the manufacturing operation thereby becomes easy.

According to another aspect of the present invention, an inflator comprises a bottle having an orifice and to be charged with a high-pressure gas; a sealing plate which seals the bottle at the orifice; a perforation structure for breaking the sealing plate; and a receiving member for receiving the perforation structure. The orifice of the bottle is provided with projections formed on the peripheral surface of the orifice, extending in the peripheral direction, and key grooves formed in the peripheral surface of the orifice, extending in the axial direction. The receiving member is provided, in the inner surface at an end thereof, with guide grooves extending in the axial direction of the receiving member, for guiding the projections of the bottle when the receiving member is coupled with the bottle, grooves extending in the peripheral direction, for mating with the projections after the receiving member or the bottle rotates, and key grooves for associating with the key grooves, after the receiving member or the bottle rotates, which are formed in the peripheral surface of the orifice of the bottle. The inflator further comprises keys for preventing the bottle or the receiving member from rotation by being inserted into the key grooves of the bottle and the receiving member. The orifice of the bottle is coupled with the receiving member at the end thereof, and the bottle and the receiving member are connected to each other with the rotation of the bottle or the receiving member.

In the inflator according to the other aspect of the present invention, the length of each key groove formed in the peripheral surface of the orifice of the bottle is preferably at least twice the length of each key. The length of each key groove formed in the inner surface of the receiving member is preferably substantially the same as the length of each key or greater. The keys are preferably completely inserted into the key grooves formed in the inner surface of the receiving member after the bottle and the receiving member are assembled with each other.

When the length of the key grooves of the bottle is increased, mounting of the keys becomes easy. When the length of the key grooves of the receiving member is substantially the same as the length of the keys or greater, the keys once inserted into the key grooves of the receiving member cannot be removed, whereby both components cannot be disassembled from each other.

DESCRIPTION OF THE EMBODIMENTS

The present invention will be further described below with reference to the drawings.

FIG. 1 is a perspective view of a part of an inflator according to an embodiment of the present invention.

FIG. 2 is a longitudinal sectional view of the inflator shown in FIG. 1 for describing the entire structure thereof.

The entire structure and the operation of the inflator are described below with reference to FIG. 2.

An inflator 1 includes, as major components, a bottle 3, a sealing plate 5, a diffuser (receiving member) 7, an initiator 9, a barrel 11, and a piston 13. The diffuser 7 receives a structure including the initiator 9, the barrel 11, the piston 13, and the like, the structure being for perforating the sealing plate 5.

The bottle 3 is made of steel or the like and is formed as a cylinder with a bottom. The bottle 3 is charged with an inactive gas or the like at a high pressure. A ring-like orifice member 16 is connected to the bottle 3 at an end thereof to the left in the drawing (at the side of an open end). Two sets of projections are formed, each set including two projections 43 being parallel to each other and extending in the peripheral direction of the orifice member 16. The two sets of the projections 43 are disposed in two positions opposing each other of the periphery of the orifice member 16. The orifice member 16 is provided with a flange 17, which extends to the inner side of the orifice member 16, at the inner periphery of the orifice member 16 at the side of the bottle 3. An aperture 17a is formed at a central part of the flange 17. An orifice 15 of the orifice member 16 to the left in the drawing is straight open.

The sealing plate 5 is fixed to the flange 17 of the orifice member 16 by welding or the like from the inner side of the bottle 3. The sealing plate 5 is a planar circular plate made of steel or the like, and has a thickness of, for example, 0.4 mm. When the bottle 3 is not charged with high-pressure gas, the sealing plate 5 is kept flat. However, when a high-pressure gas is sealed in the bottle 3, the sealing plate 5 swells in a spherical shape with the pressure of the gas toward the outside of the bottle 3 at the aperture 17a of the flange 17.

The diffuser 7 is a cylindrical member made of steel or the like, the ends of which are open. The diffuser 7 is provided at the inner surface thereof at the right end with two sets of grooves extending in the peripheral direction, each set including two grooves 41 parallel to each other and being formed in two positions opposing each other. The diffuser 7 and the orifice member 16 are fixed to each other by coupling the right open end of the diffuser 7 with the orifice 15 of the orifice member 16 and rotating the diffuser 7 and the orifice member 16 relative to each other, thereby mating the grooves 41 with the projections 43 of the orifice member 16. The fixing structure is described below.

The left end of the diffuser 7 serves as an outlet 19 for the high-pressure gas. The gas outlet 19 is connected to an airbag which is not shown. The diffuser 7 is provided with a through-hole 7a formed in the sidewall at an upper part of the diffuser 7. A housing 21 is inserted into and affixed at the through-hole 7a. A closure 35 is coupled with the housing 21 at the inside thereof. The closure 35 is mounted with an ignition plug 23 and the initiator 9. The housing 21 is provided at a lower part thereof with a space 25 extending substantially to the center of the diffuser 7. A through-hole 27 is formed in the sidewall of the housing 21 in the lower part thereof at the bottle side.

The cylindrical barrel 11 is connected to the through-hole 27 formed in the lower part of the housing. An inner hole 11a of the barrel 11 communicates with the space 25 of the housing 21. The barrel 11 extends toward the bottle 3 along the central axis thereof. The barrel 11 is provided at the left end thereof with a step 29 with which the piston 13 comes into contact at a larger diameter portion 13b thereof, which is described below. The inner hole 11a of the barrel 11 extends straight to the right from the step 29 and is open at the right end of the barrel 11. The right end (an end at the bottle 3 side) of the barrel 11 is connected to the inner surface of the flange 17 of the orifice member 16 via a supporting plate 31. The supporting plate 31 is formed in a frusto-conical shape and is provided with a plurality of through-holes 33. The through-holes 33 serve as gas paths for the gas flowing from the bottle 3 to the diffuser 7 when the sealing plate 5 is broken. A left end 31a of the supporting plate 31 is inserted into the inner hole 11a of the barrel 11 at the right end thereof, and is formed as a step in the inner hole 11a.

The piston 13 made of stainless steel or the like is slidingly disposed in the barrel 11. The piston 13 includes a head 13a at the right end (the bottle-side end) and the larger diameter part 13b at the left end (the housing-side end) of the piston 13. The head 13a has an outer diameter smaller than the inner diameter of the barrel 11 and the end of the head 13a is two-forked. The larger diameter part 13b has an outer diameter substantially the same as the inner diameter of the barrel 11. A ring groove 13c is formed in an intermediate portion of the larger diameter part 13b. The left end of the larger diameter part 13b of the piston 13 is in contact with the step 29 disposed at the rear end of the barrel 11 in a normal state. The head 13a is positioned away from the sealing plate 5.

When an impact is applied to the automobile, the ignition plug 23 of the inflator 1 operates. The ignition plug 23 ignites the initiator 9, whereby a blast is ejected from the initiator 9 into the space 25 disposed in the lower part of the housing 21. The blast goes into the barrel 11 through the through-hole 27 formed in the lower part of the housing and pushes the piston 13 toward the bottle 3 along the central axis of the barrel 11. Then, the tip of the piston 13 cuts into the sealing plate 5 and breaks the sealing plate 5 at a portion of the sealing plate 5 corresponding to the shape of the tip of the piston 13. The piston 13 moves by being pushed until it anchors to the end 31a of the supporting plate 31 at the larger diameter part 13b of the piston 13. In this case, the piston 13 stably moves in the barrel 11 along the central axis thereof because the larger diameter part 13b of the piston 13 has a given length.

When the sealing plate 5 is broken, the piston 13 is pushed to the left in the drawing with the pressure of the high-pressure gas stored in the bottle 3, back to the position where the larger diameter part 13b of the piston 13 is anchored to the step 29 disposed inside the barrel 11. The high-pressure gas which has been stored in the bottle 3 flows into a space between the flange 17 and the supporting plate 31 through a part 5a of the sealing plate 5 at which the sealing plate 5 has been broken, goes into the diffuser 7 through the through-holes 33 of the supporting plate 31, and is discharged through the gas outlet 19.

The configuration of the orifice member 16 and the diffuser 7 is described below with reference to FIG. 1. The outer diameter of the orifice member 16 is substantially the same as the inner diameter of the diffuser 7. The orifice member 16 mates with the diffuser 7. The orifice member 16 and the diffuser 7 are connected to each other with the projections and the grooves mating with each other with the orifice member 16 and the diffuser 7 being rotated relative to each other, and are fixed to each other by separate keys 45.

The keys 45 are made of steel or the like and are each formed in a rectangular parallelepiped shape.

Two sets of the two projections 43 extending in the peripheral direction are formed on the periphery of the orifice member 16. The two sets of the projections 43 are formed symmetrical to each other at an angle of 180° with respect to the axis of the orifice member 16. Each projection 43 has given height and width. The height of the projection 43 gradually decreases toward the longitudinal ends thereof. The length of each projection 43 in the peripheral direction is approximately ¼ of the circumference of the outer surface of the orifice member 16.

In the peripheral surface of the orifice member 16, key grooves 47 which extend in the axial direction from the open end of the orifice member 16 are formed. The key grooves 47 are disposed symmetrical to each other at an angle of 180° with respect to the axis of the orifice member 16 and at an angle of 90° apart from the projections 43 around the axis of the orifice member 16. Each key groove 47 is open at one end thereof at the open end of the orifice member 16 and the bottom of the key groove 47 is inclined so as to gradually merge into the peripheral surface of the orifice member 16 at the other end of the key groove 47. The length of each key groove 47 is at least approximately twice the length of the key 45. The bottom of each key groove 47 is flat in a portion from the open end thereof having a length twice the length of the key 45.

A set of the two grooves 41 parallel to each other and extending in the peripheral direction are formed in the inner surface of the diffuser 7. Another set of the two grooves 41 is disposed symmetrical to and at an angle of 180° apart from the set of the two grooves 41 with respect to and around the axis of the diffuser 7. The depth of the grooves 41 is substantially the same as the height of the projections 43 formed on the orifice member 16. The width of each groove 41 is substantially the same as that of the projection 43. The length in the peripheral direction of each groove 41 is approximately ¼ of the inner periphery of the diffuser 7. The distance in the axial direction between the grooves 41 is the same as that in the axial direction between the projections 43. The grooves 41 mate with the projections 43 of the orifice member 16.

The diffuser 7 is provided with two guide grooves 49 formed in the inner surface of the diffuser 7 and extending in the axial direction from the open end of the diffuser 7. The two guide grooves 49 are disposed symmetrical to each other with respect to the axis of the diffuser 7. The two guide grooves 49 are disposed at an angle of 180° apart from each other and an angle of 90° apart from the grooves 41 around the axis of the diffuser 7. The depth of the guide grooves 49 is the same as the height of the projections 43 of the orifice member 16. The width of each guide groove 49 is the same as the length of each projection 43 (that is, approximately ¼ of the inner periphery of the diffuser 7). The grooves 41 are formed between the two guide grooves 49 such that the bottoms of the grooves 41 are gradually inclined downward from the sidewalls of the guide grooves 49. The length of each guide groove 49 in the axial direction is substantially the same as the distance between the open end and the groove 41 disposed at the rear side.

A key groove 51 is formed extending in the axial direction from the open end of the diffuser 7 in a widthwise intermediate part of the bottom of each guide groove 49. The section of each key groove 51 is rectangular. The length of the key groove 51 is substantially the same as that of the key 45.

A method for fixing the orifice member 16 and the diffuser 7 to each other is described below.

In FIG. 3, the method for fixing the orifice member and the diffuser to each other is shown.

As shown in FIG. 3(A), the keys 45 are firstly placed at the rearmost sides of the key grooves 47 of the orifice member 16. The projections 43 of the orifice member 16 are aligned with the guide grooves 49 formed in the inner surface of the diffuser 7, and the orifice member 16 and the diffuser 7 are coupled with each other. The orifice member 16 is inserted until the leading ends of the projections 43 reach the end walls of the guide grooves 49.

Then, the orifice member 16 and the diffuser 7 are rotated relative to each other by 90°, as shown in FIG. 3(B), whereby the two sets of the projections 43 of the orifice member 16 mate with the two sets of the grooves 41 of the diffuser 7. In this case, both components mate with each other with the gradually inclined upper faces of the projections 43 smoothly coupling with the grooves 41. With this coupling, the orifice member 16 and the diffuser 7 are prevented from being removed from each other in the axial direction.

In this position, the key grooves 47 of the orifice member 16 associate with the key grooves 51 of the diffuser 7, as shown in FIG. 3(B). The keys 45 are knocked deeply into the key grooves 51 from the rear sides at the bottle sides of the key grooves 47 toward the left in the drawing by using a tool. Since each key groove 51 of the diffuser 7 has a length the same as that of the key 45 or greater, the keys 45 are pressed completely into the diffuser 7 (see FIG. 3(C)). The orifice member 16 or the diffuser 7 cannot rotate due to the keys 45. The keys 45 which have been once knocked deeply into the grooves 51 cannot be removed by ordinary means, whereby the orifice member 16 and the diffuser 7 are fixed to each other so as not to be removed from each other.

[Advantages]

As described above, according to the present invention, a bottle charged with a high-pressure gas and a container for a perforation structure are connected to each other so as not to be removed from each other by using projection-groove coupling and keys and key grooves. Therefore, the bottle and the container can be assembled with each other so as not to be removed from each other without performing welding, whereby an inflator easy to manufacture can be provided.

BRIEF DESCRIPTION OF THE DRAWINGS

FIG. 1 is a perspective view of a part of an inflator according to an embodiment of the present invention, for showing the configuration of the inflator.

FIG. 2 is a longitudinal sectional view showing the entire structure of the inflator shown in FIG. 1.

FIG. 4 is a schematic longitudinal-sectional view of a stored-gas-type inflator.

REFERENCE NUMERALS

Figure 1:
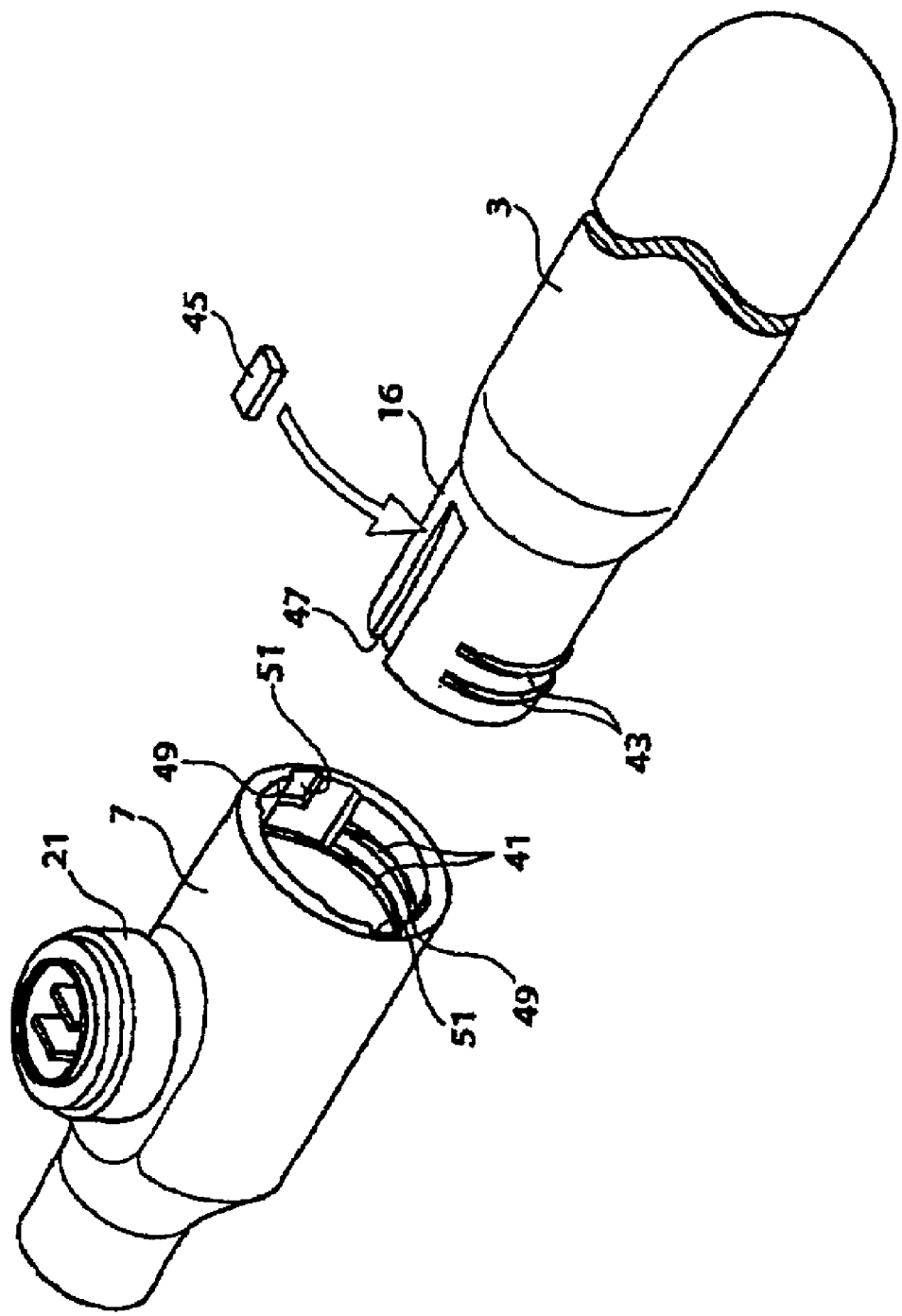
[FIG. 1]
Figure 2:
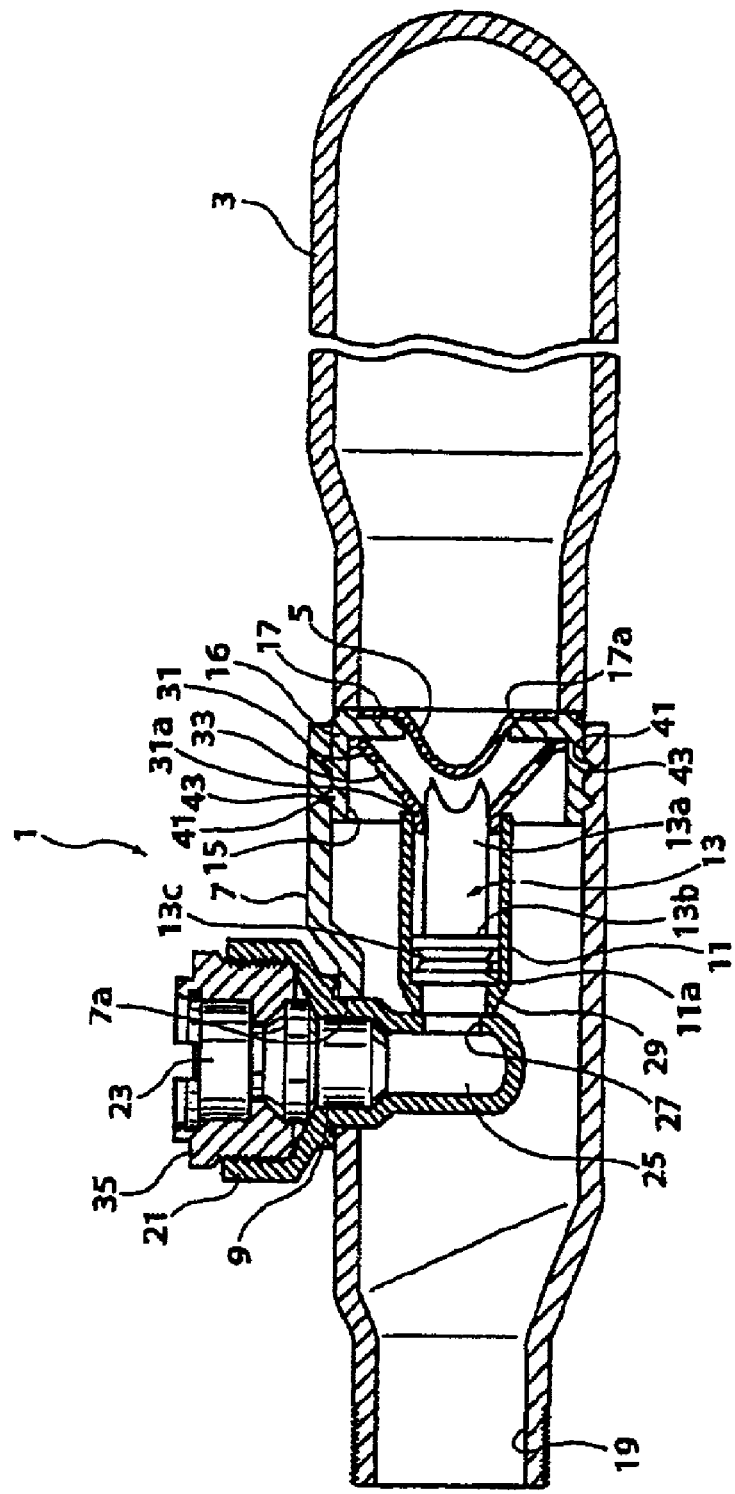
[FIG. 2]
Figure 3:
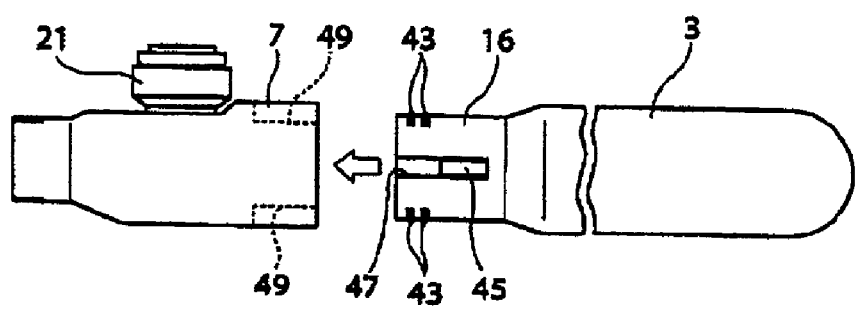
[FIG. 3]
FIG. 3 includes illustrations showing a method for fixing an orifice member and a diffuser to each other.
Figure 3:
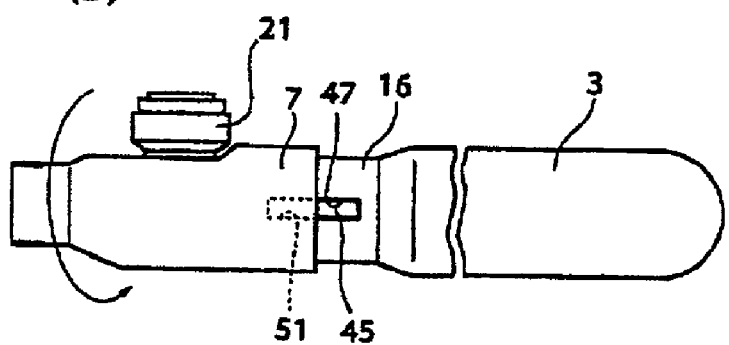
Figure 3:
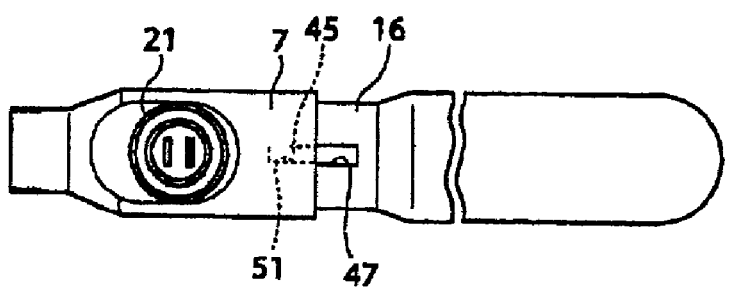
Figure 4:
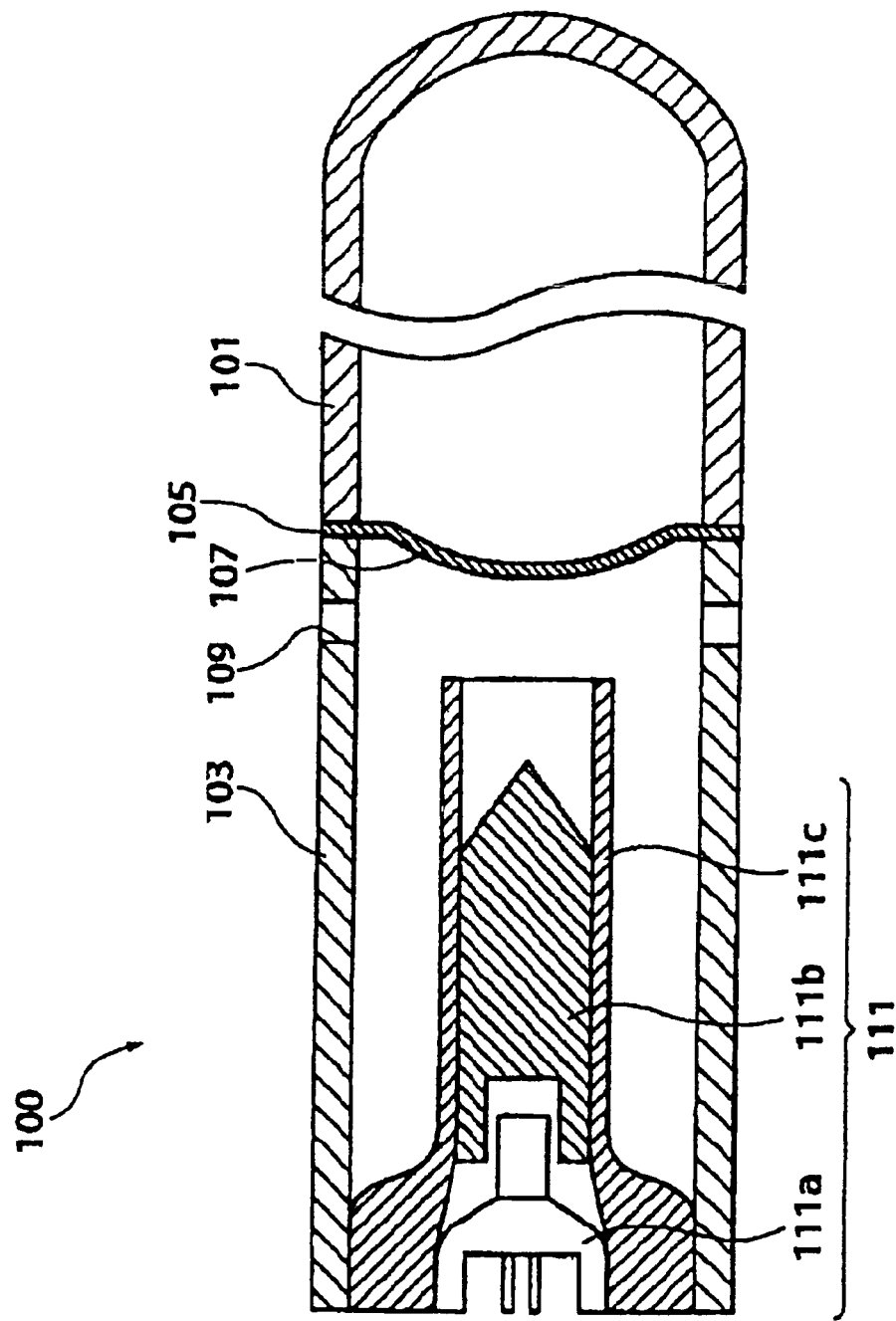
[FIG. 4]

1: inflator
3: bottle
5: sealing plate
7: diffuser (receiving member)
9: initiator
11: barrel
13: piston
15: orifice
16: orifice member
17: flange
19: outlet
21: housing
23: ignition plug
25: space
27: through-hole
29: step
31: supporting plate
33: through-hole
35: closure
41: groove
43: projection
45: key
47: key groove
49: guide groove
51: key groove

What is claimed is:

1. An inflator comprising:
a bottle configured to be charged with a high-pressure gas;
a sealing plate positioned to seal the bottle at an orifice; and
a receiving member including a perforation structure for breaking the sealing plate,
wherein one of the receiving member and the bottle includes a projection extending partially around the periphery of the receiving member or the bottle and wherein the projection mates with a groove in the other of the receiving member or bottle when the bottle and receiving member are coupled together thereby preventing the receiving member and the bottle from moving apart; and
wherein each of the receiving member and the bottle include a key groove.

2. The inflator of claim 1, wherein when the receiving member and the bottle are coupled together, the key grooves are aligned and a key is positioned in the key groove to prevent relative rotation of the bottle and the receiving member.

3. An inflator comprising:
a bottle configured to be charged with a high-pressure gas;
a sealing plate positioned to seal the bottle at an orifice; and
a receiving member having an axial direction and including a perforation structure for breaking the sealing plate,
wherein the bottle includes
projections formed on a peripheral surface of one end of the bottle extending in a peripheral direction, and
key groove formed in the peripheral surface of the one end of the bottle, extending in the axial direction;
wherein one end of the receiving member includes
a guide groove extending in the axial direction of the receiving member located on an inner surface at one end of the receiving member, the guide groove configured to guide the projection of the bottle when the receiving member is being coupled with the end of the bottle,
grooves extending in the peripheral direction, for mating with the projections after relative rotation of the receiving member and the bottle, and
key groove positioned to align with the key groove on the bottle after relative rotation of the receiving member and the bottle rotate;
a key configured to be inserted into the key grooves for preventing relative rotation of the bottle and the receiving member; and
wherein the end of the bottle is coupled with an end of the receiving member, and
wherein the bottle and the receiving member are connected to each other by the rotation of the bottle or the receiving member.

4. The inflator of claim 3, wherein the length of the key groove formed in the peripheral surface of the bottle is at least twice the length of the key.

5. The inflator of claim 4, wherein the length of the key groove formed in the inner surface of the receiving member is substantially greater than or equal to the length of the key.

6. The inflator of claim 5, wherein the inflator is configured so that the key is completely inserted into the key groove formed in the inner surface of the receiving member after the bottle and the receiving member are assembled with each other.

* * * * *